United States Patent [19]
Belloc et al.

[11] Patent Number: 4,887,257
[45] Date of Patent: Dec. 12, 1989

[54] ECHO CANCELLING DEVICE FOR DATA TRANSMISSION OVER TWO-WIRE LINES

[75] Inventors: Jacques Belloc, Antibes; Emile Morlec, St. Paul; Dominique Godard, LeRouret; Michel Quintin, LaGaude, all of France

[73] Assignee: International Business Machines Corporation, Armonk, N.Y.

[21] Appl. No.: 164,754

[22] Filed: Mar. 7, 1988

[30] Foreign Application Priority Data

Apr. 22, 1987 [EP] European Pat. Off. ......... 87430012.2

[51] Int. Cl.$^4$ ............................................. H04B 3/23
[52] U.S. Cl. ................................... 370/32.1; 379/410
[58] Field of Search .................. 377/406, 410, 411; 370/32.1, 32

[56] References Cited
U.S. PATENT DOCUMENTS

| 4,232,400 | 11/1980 | Yamamoto et al. | 370/32.1 X |
|---|---|---|---|
| 4,577,309 | 3/1986 | Barazeche et al. | 370/32.1 X |
| 4,669,116 | 5/1987 | Agazzi et al. | 379/411 |

Primary Examiner—Jin F. Ng
Assistant Examiner—Randall S. Vaas
Attorney, Agent, or Firm—John J. Timar

[57] ABSTRACT

Echo cancelling device for cancelling echoes affecting the incoming signal received over a two-wire telephone line, comprising near echo canceller 20, far echo canceller 22 and an adder 26 providing the estimated echo signal. A circuit path including a digital-to-analog converter 48 for converting the digital estimated echo signal into analog form and a subtracter 52 for subtracting the resulting analog signal from the analog incoming signal, is separated from a circuit path including an analog-to-digital converter 42 for converting the analog incoming signal into digital form and a subtracter 44 for subtracting the digital estimated echo signal from the resulting digital incoming signal thereby providing a digital signal used as a control signal for adjusting the echo cancellers 20 and 22.

9 Claims, 7 Drawing Sheets

ECHO CANCELLING DEVICE FOR DATA TRANSMISSION OVER TWO-WIRE LINES

BACKGROUND OF THE INVENTION

The present invention deals with the data transmission in full duplex on a two-wire line, and relates particularly to a device for cancelling echoes of the outgoing data signals due to the connections between the two-wire and four-wire line portions.

A family of modems is for use on connections between data terminal equipments by means of the switched telephone network. The data signals are transmitted from a transmitting modem to a receiving modem over a two-wire line. For long distances, amplifiers (repeaters) are required. Since amplifiers only operate in one direction, the data directions are split up to separate the two-wire line into a four-wire line. The connection between two and four-wire lines, and vice-versa, is made through so called hybrid couplers. Likewise, an hybrid coupler is required to connect the modem output comprising the transmitting circuit and the receiving circuit, to the two-wire line.

An hybrid coupler is a terminating set consisting of two differential transformers with three inputs, an input for each two-wire circuit of the four-wire line, and an input for the two-wire line. Because these transformers cannot be loaded with an impedance matched throughout the overall frequency bandwidth, a portion of the data signal energy goes over to the other direction and returns to the sender through the two-wire line, generating so called echoes.

Two kinds of echoes are received by the modem: the near echo resulting from the transmitted data signal leaking directly through the modem hybrid coupler toward the receiving circuit of the modem, and the far echo resulting from the transmitted data signal passing through the four-wire line and reflecting on a far hybrid coupler.

Therefore, the modems of this type are provided with echo cancellers to cancel from the incoming signal echoes of the outgoing signal. Because near and far echoes have different characteristics, it is classical to have the near echo canceller different from the far echo canceller, the outputs of both echo cancellers being added to provide an estimated value of the actual echo. This resulting estimated value is then subtracted from the incoming signal to provide theoretically the incoming signal free of echo. The error signal between the estimated and actual values of the echo is generally used to adjust the coefficients of the echo cancellers.

In fact these echo cancellers of the prior technique present drawbacks which are overcome by the present invention.

Indeed, the data signal processing in the present day modems is performed digitally under the control of a processor incorporated in the modem. Accordingly, all the operations of echo cancelling are carried out digitally resulting in an estimated echo value in digital form. This estimated value is then converted by a digital-to-analog converter into analog form before being subtracted from the incoming signal. The resulting signal has, in turn to be converted by an analog-to-digital converter into digital form so as to be used as a control signal for adjusting the echo canceller. As the incoming signal can have a wide energy level range, it is necessary to have a programmable gain amplifier (PGA) at the input of the analog-to-digital converter. The PGA value is set at the beginning of the transmission, by measuring the signal energy at the A/D converter output signal. It may happen that, because of a noise burst for instance, this energy measurement might not be accurate, especially if fast set-up is required, resulting in a bad adjustment of the PGA. Thus, observing a signal with low energy at the A/D converter output may result from either a good cancellation of the echo or from a bad adjustment of the PGA, without the possibility of distinguishing between the two possibilities.

Another drawback of the prior echo canceller is that the digital-to-analog converter which converts the estimated value of the echo into analog form, introduces a frequency distortion of the type Sin X/X. Therefore the control signal used for adjusting the echo canceller coefficients is a filtered version of the true signal, which leads to an imperfect echo cancellation, especially when the sampling frequency is low.

SUMMARY OF THE INVENTION

Therefore the object of the invention is an echo cancelling device in a modem for data transmission over a two-wire line, which overcomes the above drawbacks by separating the circuit path used for generating the control signal for adjusting the coefficients of the echo canceller from the circuit path used for generating the echo-free remote incoming signal.

The echo cancelling device according to the invention comprises echo signal generating means for providing an estimated echo signal in digital form from the transmitted outgoing digital signal, a first circuit path including a digital-to-analog converter for converting the digital estimated echo signal to analog form and analog subtracting means for subtracting the analog estimated echo signal from the incoming signal, thereby providing an echo-free analog incoming signal and, a second circuit path including an analog-to-digital converter for converting the analog incoming signal to digital form, and digital subtracting means for subtracting the digital estimated echo signal from the digital incoming signal, thereby providing a digital signal which is used as a control signal for the echo signal generating means.

The details of a preferred embodiment of the invention may be more readily ascertained from the following description when read in conjunction with the following drawings wherein:

DETAILED DESCRIPTION OF THE PREFERRED EMBODIMENT

Figure 1:
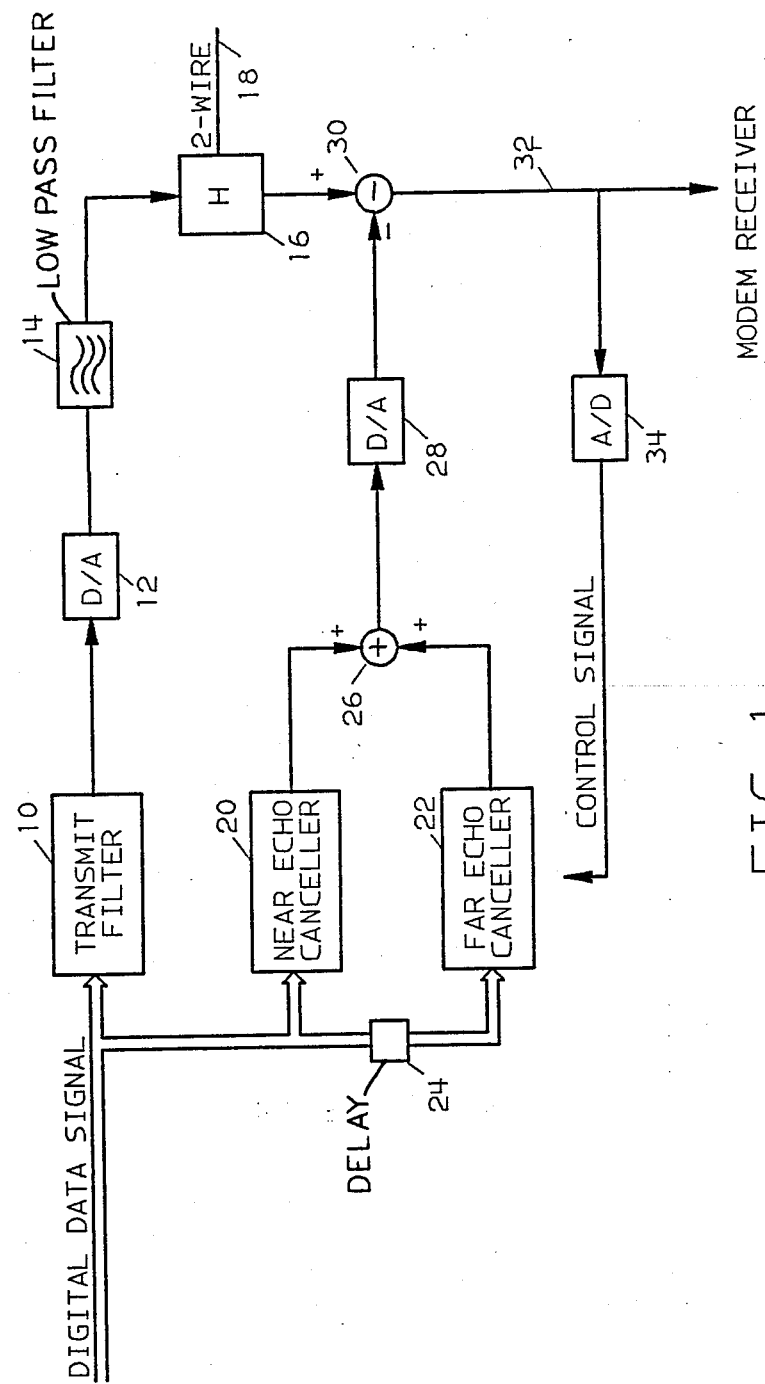
FIG. 1 is a simplified block diagram of a transmission system incorporating a conventional echo cancelling device.

FIG. 1 is a block diagram of a conventional echo cancelling system used with a system transmitting over a two-wire medium. The digital signal in complex form, that is with the in-phase and quadrature components, is provided to the two-wire line 18 via transmit filter 10, digital-to-analog converter 12, low pass filter 14, and hybrid coupler 16. It must be noted that the output of transmit filter 10 is a real signal and is shown as one line, whereas the complex signal at its input is shown as a double line. Such a representation will be used in the whole description. Also, it is must be noted that in the description of the figures, the same means will always be designated by the same references.

As echoes arise due to impedance mismatches in the hybrid couplers such as 16, the incoming signal received on line 18 is composed of three different signals: the far signal transmitted from the remote modem, the near echo resulting from the outgoing signal leaking directly through hybrid 16, and the far echo resulting from the transmitted signal reflecting on a far hybrid coupler.

Because near and far echoes have different characteristics, it is convenient to break the echo canceller into two parts, the near echo canceller 20 and the far echo canceller 22. Both echo cancellers are generally implemented as digital transversal filters with adaptive coefficients, separated by a bulk delay 24 equal to the round trip delay. Note that, as filters, the near and far echo cancellers receive as inputs the signal in complex form, and provide as outputs only a real signal.

The outputs of near echo canceller 20 and far echo canceller 22 are added in adder 26, the output of which is converted into an analog signal by digital-to-analog converter 28. The resulting analog signal which is an estimated value of the actual echo (near and far) is subtracted from the incoming signal received from the 2-wire line 18, via hybrid 16, in subtracter 30. The output of subtracter 30 on line 32 is theoretically the incoming signal free of echo and therefore, can be demodulated and decoded to recover the data transmitted by the remote modem. In fact, there is always an error between the actual value of the echo and the estimated value. This error signal is used, after digital conversion in analog-to-digital converter 34 as a control signal for adapting the coefficients of near and far echo cancellers 20 and 22.

The echo cancelling of FIG. 1 has several drawbacks. Indeed, the analog incoming signal from the remote modem has generally an energy level range between −6 dBm and −43 dBm, the near echo signal has the same energy level range (but independent) and the far echo signal has an energy level at least 10 dBm lower than the energy level of the remote incoming signal. An analog-to-digital converter such as converter 34 has a limited precision which does not apply on the whole energy level range. Thus, if the converter is adapted to receive a signal of −6 dBm as a maximum energy level, only 5 significant bits will be provided by the analog-to-digital converter with an input signal at −43 dBm, which is very insufficient.

Accordingly, it would be necessary to include a programmable gain amplifier (PGA) before analog-to-digital converter 34 so as to fully utilize the A/D converter dynamic range regardless of the energy level of the incoming signal. Such a PGA would require the inclusion of a selectable gain attenuator after the digital-to-analog converter 28.

A programmable gain amplifier (PGA) located before converter 34 would receive the error between the actual value and the estimated value of the echo, as an input when the modem is in training mode. The PGA value is set at the beginning of the transmission, by measuring the signal energy at the A/D converter output signal. It may happen that, because of a noise burst for instance, this energy measurement might not be accurate, especially if fast set-up is required, resulting in a bad adjustment of the PGA. Thus, observing a signal with low energy at the A/D converter output may result from either a good cancellation of the echo or from a bad adjustment of the PGA, without the possibility of distinguishing between the two possibilities.

Figure 2:
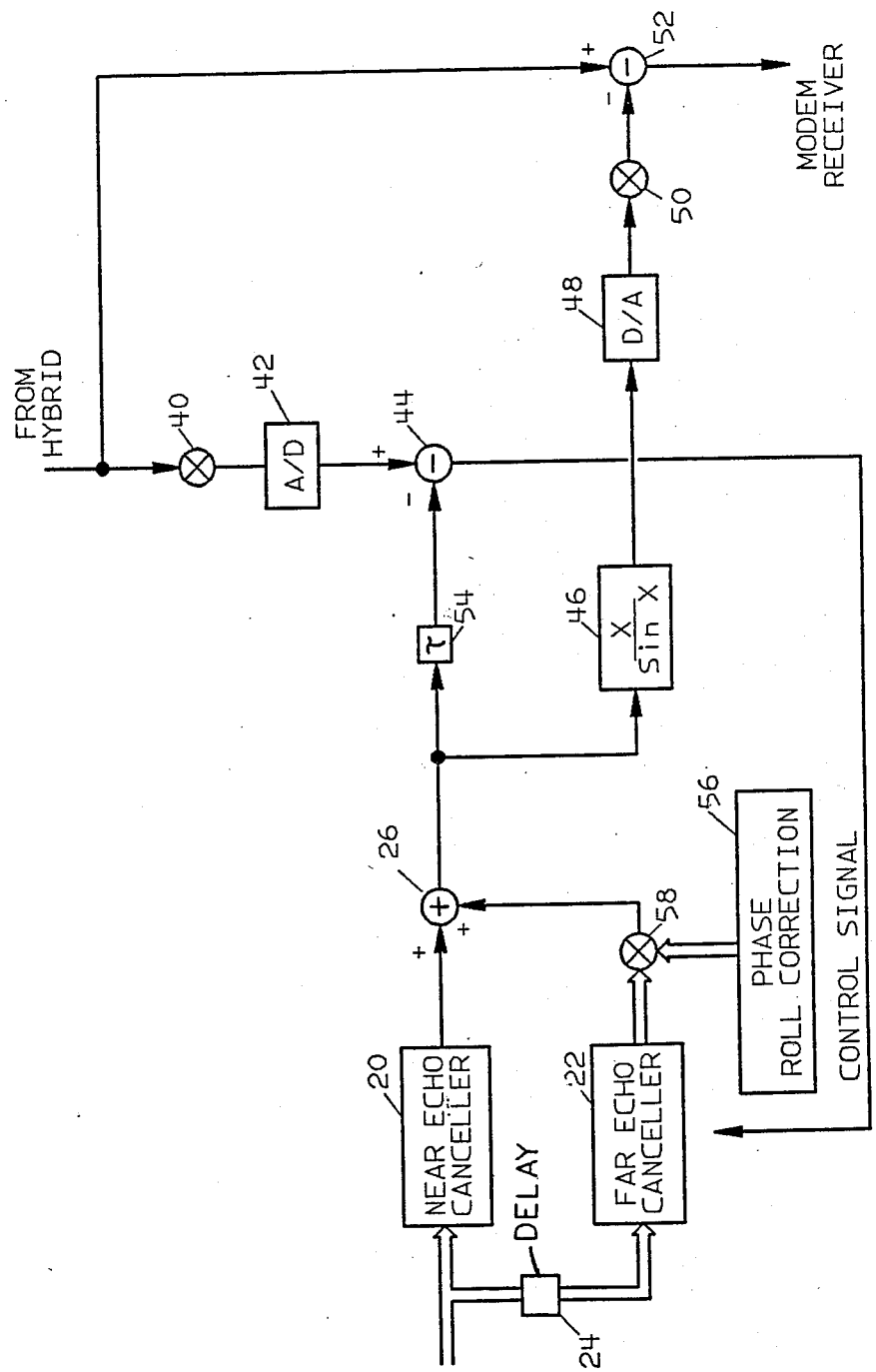
FIG. 2 is a schematic diagram of the echo cancelling device according to the present invention.

The above drawback is overcome by the embodiment shown on FIG. 2. In this implementation, the circuit path used to adapt the coefficients of the echo cancellers is separated from the circuit path for receiving the incoming signal to be processed by the modem receiver.

The incoming signal from the hybrid is directly used as input to Programmable Gain Amplifier (PGA) 40, the output of which is converted into digital form by analog-to-digital converter 42. Thus, the energy level at the input of converter 42 is independent of the cancellation rate provided by the echo canceller. Generally, PGA 40 is set once at initial training according to the near echo level. But other settings may be required for avoiding saturations when full-duplex transmission occurs.

Then, the digital estimated echo value provided by adder 26 after addition of the estimated near echo value from near echo canceller 20 and the estimated far echo value from far echo canceller 22, is subtracted from the digital incoming signal provided by converter 42, in subtracter 44. The resulting signal is then used as a control signal for adapting the coefficients of near and far echo cancellers 20, 22.

Another drawback which is overcome by the embodiment shown in FIG. 2 is that a digital-to-analog converter such as converter 28 (see FIG. 1), introduces a frequency distortion of the type Sin X/X on the generated echo signal. Such a distortion is not corrected by the A/D converter 34, and therefore, the control signal for adjusting the echo canceller coefficients is a filtered version of the true signal which leads to an imperfect echo cancellation especially when the sampling frequency is low. As shown in FIG. 2, the estimated echo signal at the output of adder 26 is filtered by digital filter 46, the transfer function of which is of the type X/Sin X. The filtered signal provided by filter 46 is provided to digital-to-analog converter 48. A selectable gain attenuator (SGA) 50 with a gain which is the reciprocal of PGA 40 gain, is located at the output of converter 48 so as to compensate for the effects of PGA 40. The attenuated signal provided by SGA 50 is then subtracted from the incoming signal coming from the hybrid by subtracter 52, with the resulting signal free of the echo signal then being sent to the modem receiver for demodulation. Thus, the Sin X/X shaping introduced by the digital-to-analog converter is compensated in a circuit path which is independent of the echo canceller adjustment loop, thereby overcoming the drawback mentioned above. In fact, filter 46 introduces a delay $\tau$ in the circuit path, which must be compensated in the circuit path used for the echo canceller adjustment by a delay circuit 54. Delay τ has been measured as 2T, T being the baud time.

As the far echo may be affected by a frequency shift due to the frequency changes in the 4-wire carrier system, some phase-roll tracking is needed. A phase-roll correction circuit 56 provides a correction signal of the form exp (jφ) which is used as multiplying factor of the estimated for echo signal in multiplier 58.

The analog-to-digital and digital-to-analog converters of FIG. 2 operate synchronously with the modem transmitter clock which provides pulses at a frequency satisfying the sampling theorem constraints and being an integer multiple of the modulation rate. Assuming that the modulation rate is 2400 bauds, the smallest possible value for the sampling frequency is therefore 7200 Hz, 9600 Hz . . . . The sampling frequency used in the following will be chosen as 9600 Hz.

Thus, near echo canceller 20 or far echo canceller 22 receives a complex signal corresponding to one constellation point per baud time, that is each 1/2400 s in the present embodiment, and has to provide four samples of a real signal per baud time, that is each 1/9600 s.

The type of echo canceller which is widely used is referred as a pass-band data-driven filter. Such a filter behaves exactly as a modem transmitter filter, except the fact that its coefficients are adaptive. For a given time span of the echo canceller filter, the number of filter coefficients to be used is proportional to the sampling frequency to signalling frequency ratio. Assuming a total echo duration of 45 ms (108 baud times), the number of adaptive coefficients required with a sampling frequency of 9600 Hz is 108×4=432. With the requirement that these coefficients are adapted each baud time, this is a burden which is not easily manageable by the modem processor.

Figure 3:
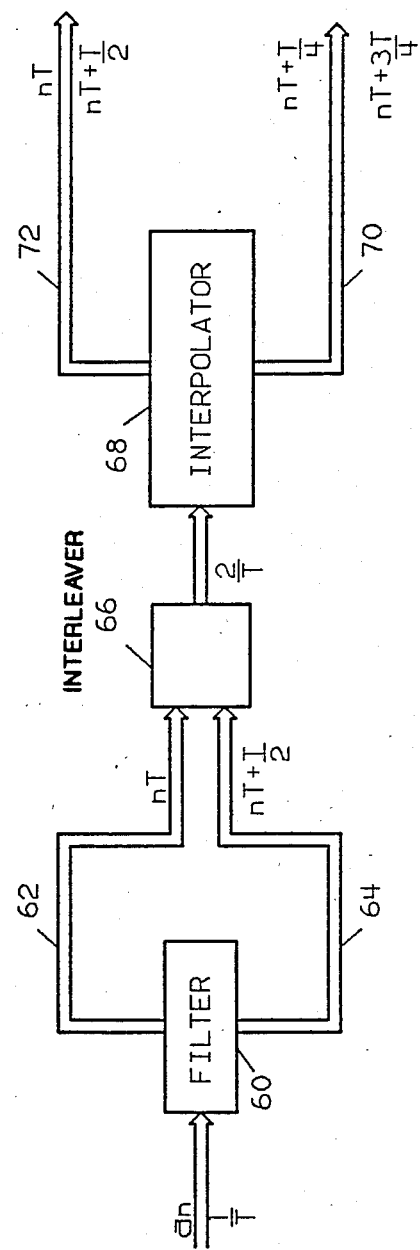
FIG. 3 depicts the structure of the echo canceller shown in FIG. 2.

A system enabling the number of echo canceller coefficients to be reduced without a loss in the accuracy is shown in FIG. 3. Such a system comprises an adaptive transversal filter combined with an interpolator. The complex signal composed of data symbol coordinates is input into adaptive filter 60 at the rate of 1/T. Filter 60 has two outputs 62 and 64. The samples on outputs 62 and 64 are interleaved by interleaving block 66 so that the samples on output 62 are taken at times nT and the samples on output 64 are taken at times nT+T/2. These samples are then used as inputs (at the rate of 2/T) to interpolator 68 which derives two interpolated samples at times nT+T/4 and nT+3T/4 on output 70, whereas output 72 provides samples at time nT and nT+T/2.

This system saves important computing time insofar as the number of coefficients to be computed each baud time is divided by two, the coefficients of the interpolator being computed as explained later on.

It should be noted that the adjustment of the echo canceller coefficients is generally carried out at the beginning of the data transmission, that is when a training sequence is sent from the local modem to the remote modem, while the latter modem does not transmit any information. The coefficients are then frozen during the data exchange between the two modems.

Figure 4:
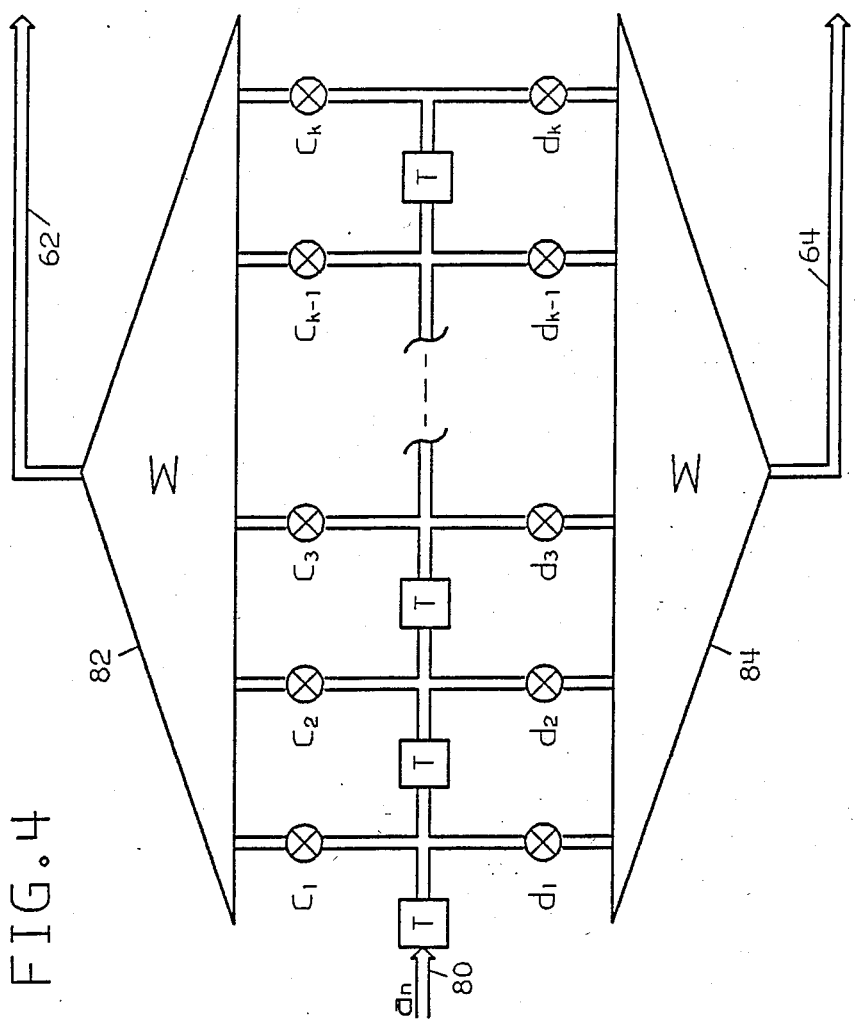
FIG. 4 is a schematic diagram of the pass-band transversal filter comprised in the echo canceller of FIG. 3.

An adaptive transversal filter which can be used in the echo canceller is shown in FIG. 4. The complex data symbols $a_n$ arrive at the input of delay line 80 composed of delay cells T, at the rate of 1/T (in the embodiment 2400). There are two parts in the filters, the 'even' filter with taps corresponding to complex coefficients c1, c2, . . . ck, and the 'odd' filter with taps corresponding to complex coefficients d1, d2, . . . dk. The outputs of the 'even' taps are summed up by adder 82 to provide on output 62 the output signal S(n,o) at time nT, given by $$S(n,o) = \sum_{j=1}^{k} a_{n-j} \cdot cj$$

The outputs of the 'odd' taps are summed up by adder 84 to provide on output 64 the output signal S(n,2) at time nT+T/2, given by $$S(n,2) = \sum_{j}^{k} a_{n-j} \cdot dj$$

Figure 5:
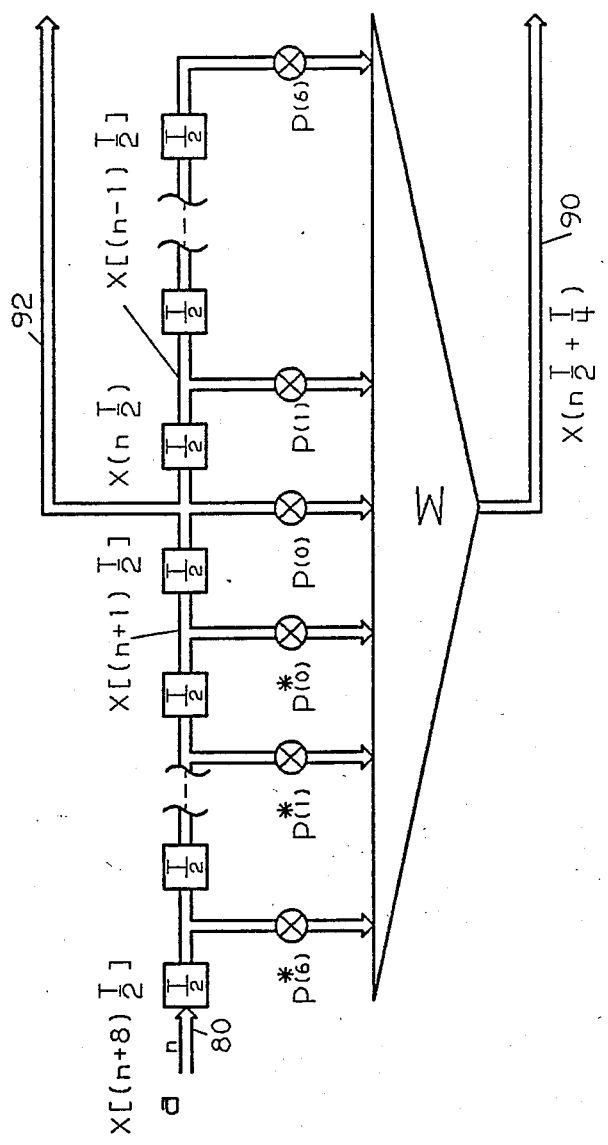
FIG. 5 is a schematic diagram of the interpolator comprised in the echo canceller of FIG. 3.

The interpolator 68 is now described in reference to FIG. 5.

The interpolation is first considered in the case of baseband signals. The signals provided by the adaptive transversal filter of FIG. 4, are received at input of the interpolator at times nT and nT+T/2.

Given a sequence of signal samples

X[(n+1)T/2], X[nT/2], X[(n−1)T/2]

the problem is to derive an estimate of the signal

X[n T/2+T/4]

Such as estimate is taken as a linear combination of the actual signal samples:

$$X[nT/2 + T/4] = \sum_{k=0}^{L} p_k X[(n - k)T/2] + q_k X[(n + k + 1)T/2]$$

The above equation simply represents the operation of a conventional transversal filter with 2L+2 taps, with a tap spacing equal to T/2 (here 1/4800 s). This filter is taken symmetrical (pk=qk), so that the problem is to find the set of coefficients pk that minimizes the mean-square error.

$$\epsilon^2 = E < X[nT/2 + T/4] - \sum_{0}^{L} p_k \{X[(n - k)T/2 + X[(n + k + 1)T/2]\}>^2$$

where E represents the mathematical expectation over all possible transmitted data sequences.

The computation of coefficients pk by means of the signal autocorrelation function is well known in the art, and will not be developed here.

Then, the passband interpolator coefficients are simply derived from the baseband ones by modulating then by the carrier frequency fc, which yields a complex filter with coefficients p(k)=p1(k)+jp2(k)

and p(k)=p1(k)−jp2(k)

given by $$p_1(k) = p_k \cos 2\pi f_c(T/4 + kT/2)$$

$$p_2(k) = p_k \sin 2\pi f_c(T/4 + kT/2)$$

With a complex passband signal $X_1(nT/2) + jX_2(nT/2)$ at the interpolating filter input, the interpolated samples $X_1(nT/2 + T/4) + jX_2(nT/2 + T/4)$ are obtained through the following equations:

$$X_1(nT/2 + T/4) = \sum_0^L p_1(k) <X_1(n-k)T/2] + X_1[(n+k+1)T/2]> - p_2(k) <X_2[(n-k)T/2] - X_2[(n+k+1)T/2]>$$

$$X_2(nT/2 + T/4) = \sum_0^L p_1(k) <X_2[(n-k)T/2] + X_2(n+k+1)T/2> + p_2(k) <X_1[(n-k)T/2] - X_1[(n+k+1)T/2]>$$

These equations represent the operation of a complex transversal filter with symmetric (real parts) and anti-symmetric (imaginary parts) coefficients.

With $L=6$, the coefficients p1(k) and p2(k) are given in Table I.

TABLE 1

| | |
|---|---|
| $p_1(0) = 0.240203$ | $p_2(0) = 0.579902$ |
| $p_1(1) = 0.172398$ | $p_2(1) = 0.071410$ |
| $p_1(2) = 0.081660$ | $p_2(2) = -0.033825$ |
| $p_1(3) = 0.016588$ | $p_2(3) = -0.040047$ |
| $p_1(4) = -0.007437$ | $p_2(4) = -0.017953$ |
| $p_1(5) = -0.006587$ | $p_2(5) = -0.002728$ |
| $p_1(6) = -0.001579$ | $p_2(6) = 0.000654$ |

Such an interpolator introduces a delay in the reconstruction of the signal. This delay must be equal to an integer number of symbol intervals. One dummy dalay has been added for that purpose, as shown on FIG. 5, so that the interpolator delay equals to 4T.

Interpolator 68 provides the interpolated samples $X(nT/2 + T/4)$ on output 90 whereas samples $X(nT/2)$ are obtained on output 92.

Figure 6:
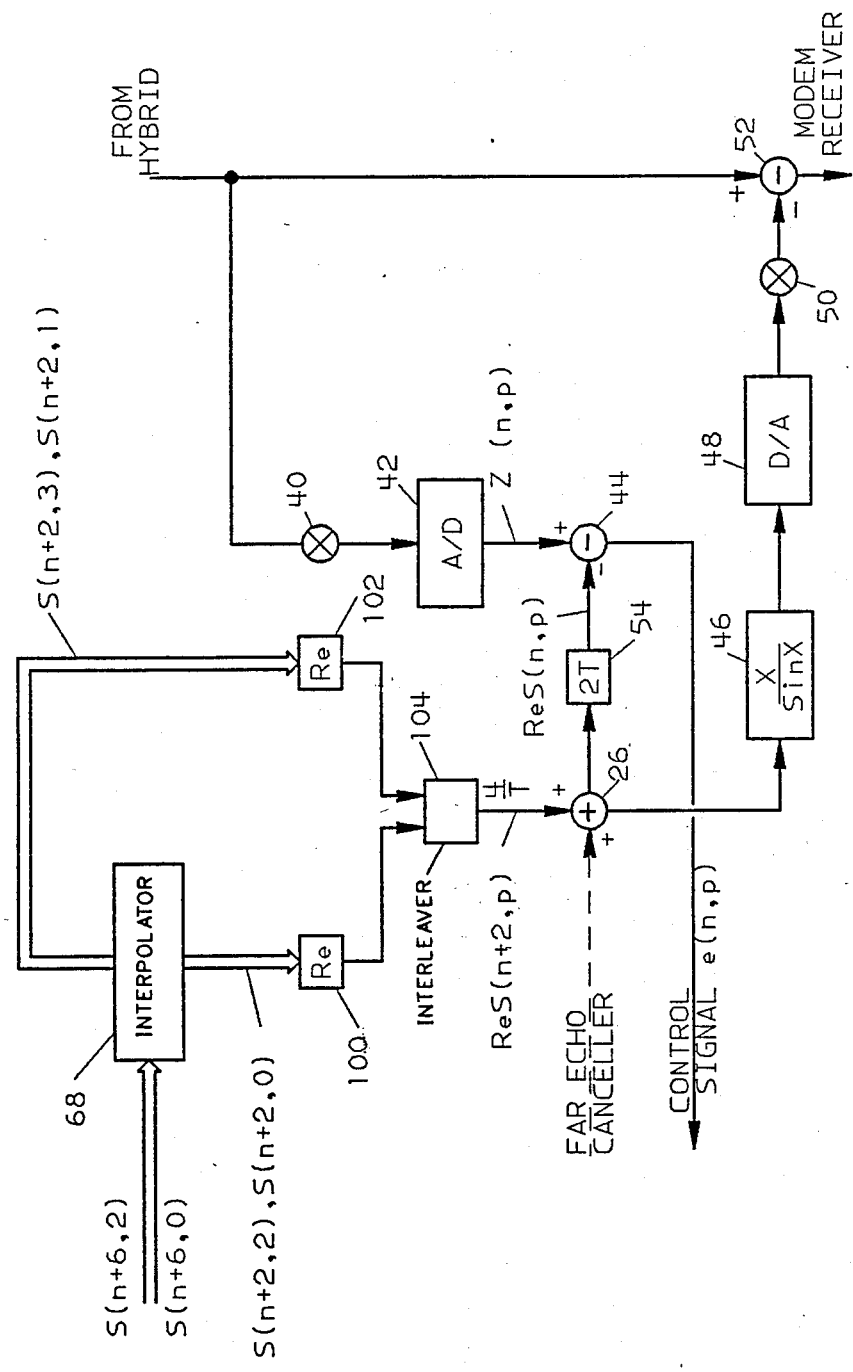
FIG. 6 is a block diagram showing the time data flow of the samples provided at the output of the near echo canceller.

In reference to FIG. 6, the sample data flow is now described from the input of the interpolator of the near echo canceller to the control signal obtained at the output of subtracter 44.

Within the same baud time, two samples $S(n+6,0)$ and $S(n+6,2)$ are input into interpolator 68, the latter derives two interpolated and delayed samples $S(n+2,1)$ and $S(n+2,3)$ on one output and two only delayed samples $S(n+2,0)$ and $S(n+2,2)$ on the other output. The real part of the two non-interpolated samples is taken in block 100, whereas the real part of the two interpolated samples is taken in block 102. It must be noted that the rank n+6 of the sample of the interpolator, and the rank n+2 at its output indicates the delay of 4 baud times introduced by the interpolator.

Then, the interpolated samples and the non-interpolated samples are interleaved by interleaving block 104 to provide the 4 real samples each baud time required for D/A conversion; that is Re $S(n+2, p)$ with p being 0, 1, 2 or 3.

After being added to the corresponding samples from far echo canceller in adder 26, samples Re $S(n+2,p)$ are delayed by 2T (corresponding to the delay introduced by X/Sin X filter 46) in block 54 so that within the same baud time, 4 real samples Re $S(n,p)$ with $p=0, 1, 2$ or 3 are provided to subtracter 44.

Concomittantly with the samples Re $S(n,p)$, A/D converter 42 produces 4 real-valued samples $Z(n,p)$ per baud time, from which 4 error signals $e(n,p)$ are derived in subtracter 44:

$$e(n,p) = Z(n,p) - \text{Re} S(n,p)$$

(with $p=0, 1, 2$ or 3).

The near echo canceller coefficients ck and dk (see FIG. 4) must be adjusted to minimize the mean-square error $$<e^2> = E<e^2(n,0) + e^2(n,2)>$$

where E is the mathematical expectation over all possible data sequences. It must be noted that the error signals corresponding to the interpolated samples are not necessary for adjusting the echo canceller coefficients.

Figure 7:
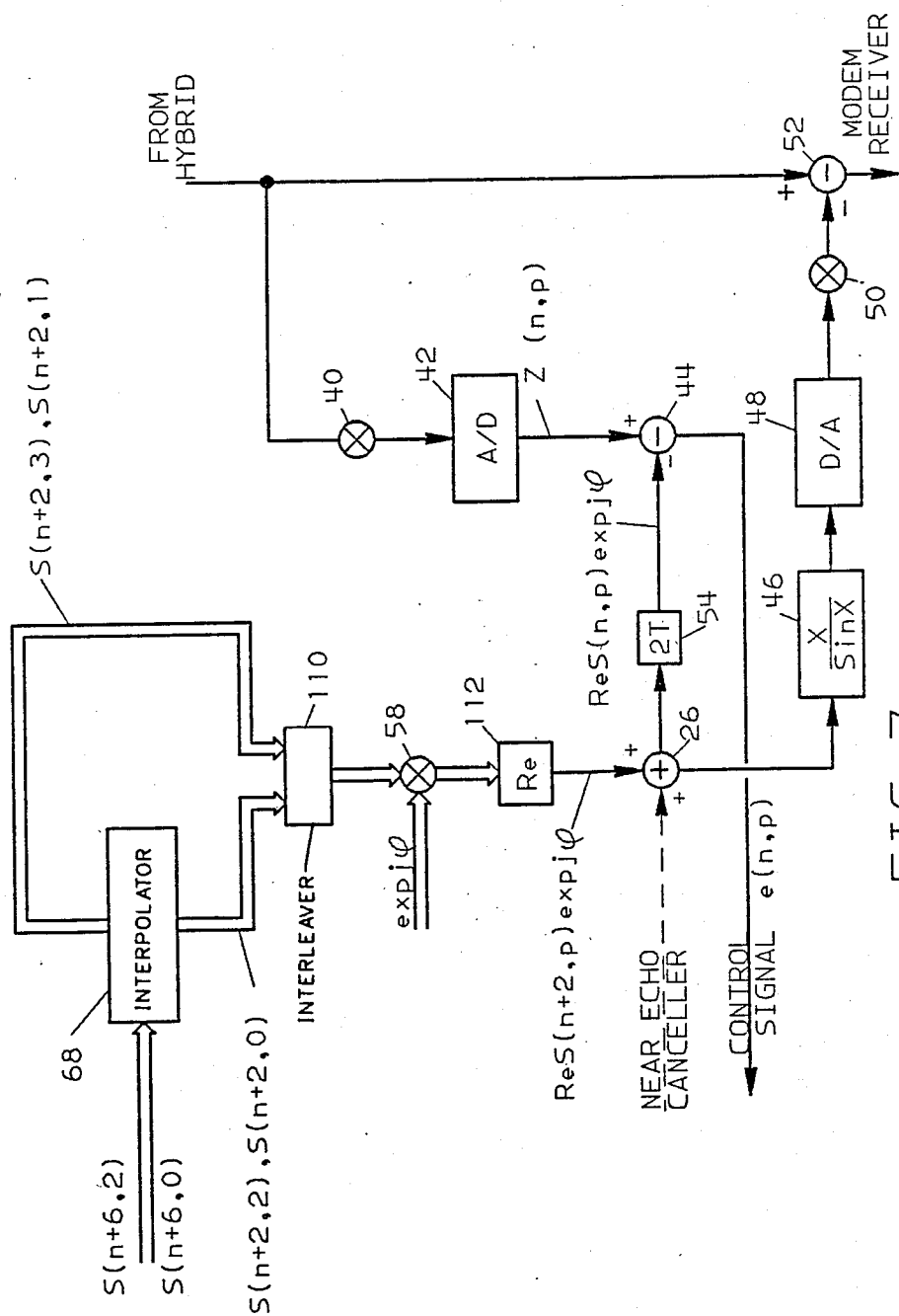
FIG. 7 is a block diagram showing the time data flow of the samples provided at the output of the far echo canceller.

FIG. 7 shows the sample data flow for the far echo canceller. The difference with the near echo canceller results from the fact that the far echo canceller has to eliminate echoes affected by phase-roll.

The interpolated samples and the non-interpolated samples from interpolator 68 are interleaved by interleaving block 110 to provide 4 complex samples per baud time. These samples are rotated by time varying angle $\phi(n,p)$ (p being 0, 1, 2, or 3) by multiplying each complex sample $S(n+2,p)$ by $\exp j\phi(n,p)$ in multiplier 58. The real part of the resulting signal is taken in block 112 to provide the 4 real samples per baud time required for D/A conversion. Then, the operations are the same as for the near echo canceller case illustrated by FIG. 6.

Nevertheless, it must be noted that the error samples $e(n,p)$ produced at the output of subtracter 44 have to be multiplied by the complex factor $\exp(-j\phi)$ before being used as control signals for adjusting the coefficients of the far echo canceller, so as to compensate the factor $\exp j\phi$ by which the samples produced at the output of the far echo canceller have been multiplied.

All the data signal processing in the present day modems, and in particular the processing required to implement the present invention, is performed digitally under the control of a processor incorporated in the modem. Though such a processor is generally a general purpose processor, one skilled in the art will to understand that a special purpose processor can be implemented using the teachings of the present invention.

What is claimed is:

1. In a data transmission system connected to a two-wire line portion (18) of a transmission medium over which the transmission of an outgoing signal in analog form which has been converted from an outgoing signal in digital form can be made simultaneously with the reception of an incoming signal in analog form, wherein said incoming signal in analog form is composed of a signal received from a remote system and an echo signal, produced by said transmission medium in response to said outgoing signal in analog form, an echo cancelling device for providing a generated echo signal for said incoming signal in analog form and subtracting said generated echo signal from said incoming signal in analog form, said echo cancelling device being characterized in that it comprises:

echo signal generating means (20, 22, 26) for providing an estimated echo signal in digital form from the outgoing signal in digital form;

a first circuit path including a digital-to-analog converter (48) for converting said digital estimated echo signal to analog form, and analog subtracting means (52) for subtracting said analog estimated echo signal from said incoming signal in analog form, thereby providing an echo-free signal in analog form, and a second circuit path including an analog-to-digital converter (42) for converting said incoming signal in analog form to digital form, and digital subtracting means (44) for subtracting said digital estimated echo signal from said incoming signal in digital form, thereby providing a digital signal which is used as a control signal for said echo signal generating means.

2. Echo cancelling device according to claim 1 wherein said outgoing signal in analog form results from a data signal having a modulation rate of 1/T, and said echo signal generating means (20, 22, 26) provide a number N of digital samples satisfying the sampling theorem in response to one sample received each baud time T.

3. Echo cancelling device according to claim 2 wherein said echo signal generating means comprises a near echo canceller (20) for generating an estimated near echo signal, a far echo canceller (22) for generating an estimated far echo signal, and an adder (26) for combining said estimated near echo signal and said estimated far echo signal to provide said digital estimated echo signal.

4. Echo cancelling device according to claim 3 wherein said near echo canceller and said far echo canceller are each comprised of:

a pass-band digntal transversal filter (60) having a number of adaptive taps which depends on the total echo duration, and providing M samples of each estimated echo signal each baud time T, and an interpolator (68) having taps, the values of which are predetermined, said interpolator which is connected to the output of said pass-band digital transversal filter providing N-M interpolated samples each baud time T, in response to said M samples of said estimated echo signal.

5. Echo cancelling device according to claim 4 wherein said pass-band digital transversal filter (60) provides 2 samples of said estimated echo respectively at times nT and nT+T/2, and said interpolator (68) provides 2 interpolated samples respectively at times nT+T/4 and nT+3T/4 in response to the 2 samples provided by said pass-band digital transversal filter.

6. Echo cancelling device according to claim 2, wherein said modulation rate 1/T=2400 baud.

7. Echo cancelling device according to claim 1 wherein said first circuit path includes a compensating filter (46) having a transfer function X/Sin X, located before said digital-to-analog converter (48) for compensating the filtering effect of the form Sin X/X introduced by said digital-to-analog converter, and a delay element (54) is located between said echo signal generating means (20, 22, 26) and said digital subtracting means (44) for delaying said digital estimated echo signal by a time duration equal to the delay introduced by said compensating filter (46).

8. Echo cancelling device according to claim 1 wherein said second circuit path includes a programmable gain amplifier (40) located before said analog-to-digital converter (42), and said first circuit path includes a selectable gain attenuator (50) located after said digital-to-analog converter (48), the attenuation factor of which is the reciprocal of the gain of said programmable gain amplifier.

9. Echo cancelling device according to claim 3 further comprising a phase-roll tracking device (56) for generating a phase-roll correction value, and a multiplier (58) for applying said phase-roll correction value to the estimated far echo signal.

* * * * *